United States Patent [19]

Hinkle

[11] 4,029,909
[45] June 14, 1977

[54] OPERATOR SUPERVISORY CIRCUIT FOR A KEY TELEPHONE SYSTEM

[75] Inventor: James Edwin Hinkle, Palmyra, Pa.

[73] Assignee: International Telephone and Telegraph Corporation, Nutley, N.J.

[22] Filed: Mar. 23, 1976

[21] Appl. No.: 669,427

[52] U.S. Cl. .................................................. 179/99
[51] Int. Cl.² ......................................... H04M 1/00
[58] Field of Search ............... 179/99, 18 F, 18 FA, 179/84 L

[56] References Cited

UNITED STATES PATENTS

| 3,395,256 | 7/1968 | Limiero et al. | 179/99 |
| 3,609,249 | 9/1971 | Piwede | 179/99 |
| 3,752,936 | 8/1973 | Morse | 179/99 |
| 3,906,168 | 9/1975 | McEowen | 179/99 |

Primary Examiner—Kathleen H. Claffy
Assistant Examiner—Gerald L. Brigance
Attorney, Agent, or Firm—John T. O'Halloran; Alfred C. Hill

[57] ABSTRACT

A switching arrangement coupled to an operator's subset, a called party's subset, a source of key system positive ground, a supervisory indicator lamp and a line button lamp operates to light the indicator lamp when the operator's subset is taken off-hook to answer an incoming call, to cause the line button lamp to wink when the operator's subset is placed on hold to disperse the incoming call to a called party's subset, to extinguish the indicator lamp and the line button lamp wink when the called party's subset is taken off-hook and to cause the line button lamp to again wink when the called party's subset is placed on hold after the called party's subset has been taken off-hook.

9 Claims, 1 Drawing Figure

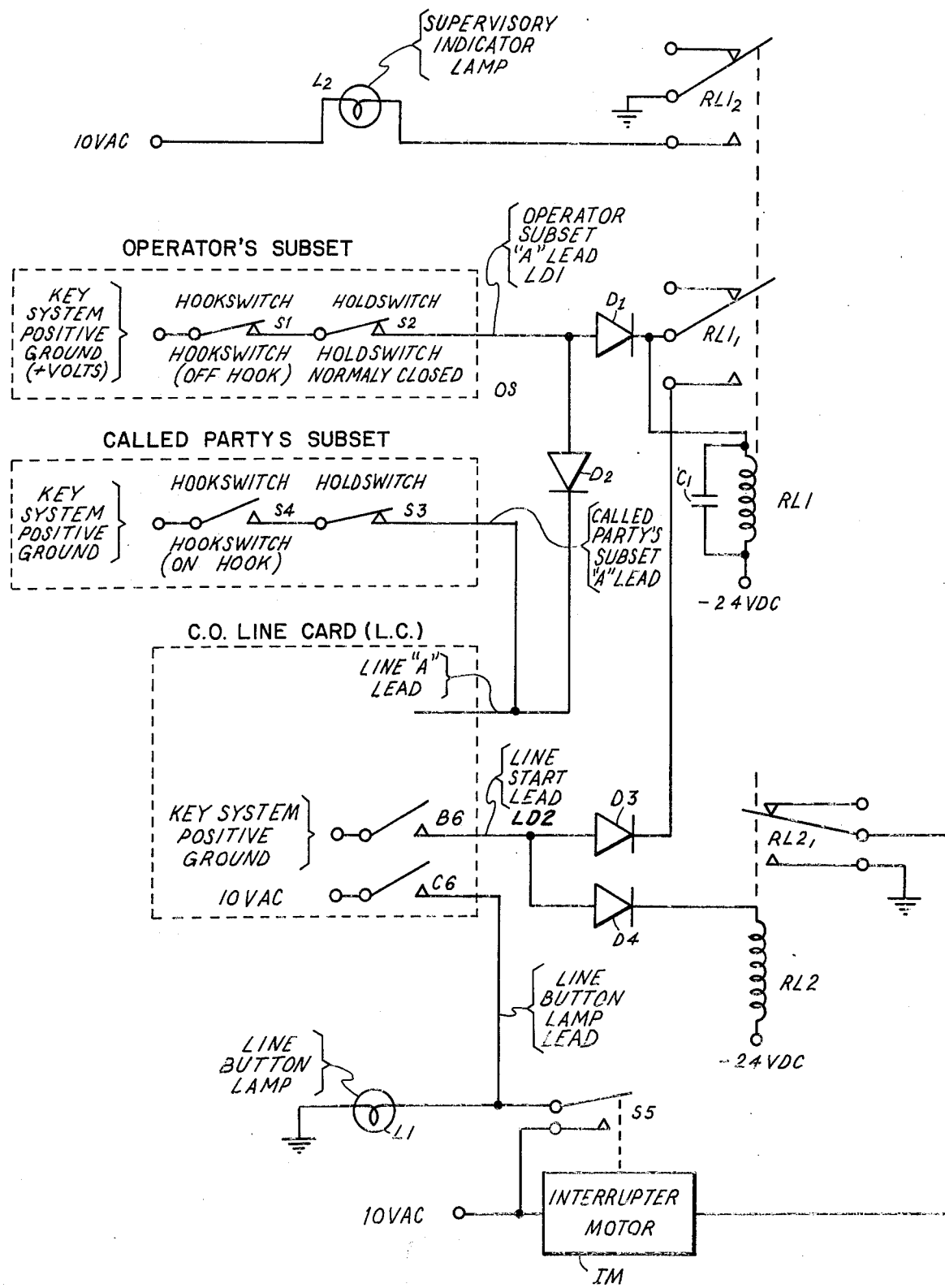

OPERATOR SUPERVISORY CIRCUIT FOR A KEY TELEPHONE SYSTEM

BACKGROUND OF THE INVENTION

This invention relates to telephone systems and more particularly to a key telephone system.

During the course of the following description and when reading the claims, it should be remembered that due to the design and operation of a key telephone system there is a ground employed therein which is actually a positive voltage and is referred to herein as key system positive ground or merely positive ground.

In presently known key telephone systems, which incorporate a rather large number of central office lines, the operator, after placing the operator subset on hold and dispersing the calls to a called party, would have no means of knowing whether calls were answered and placed back on hold by the called party.

SUMMARY OF THE INVENTION

An object of the present invention is to provide an operator supervisory circuit for a key telephone system which would advise the operator when the called party has answered and also when the called party has placed his subset on hold.

A feature of the present invention is the provision of an operator supervisory circuit for a key telephone system comprising: a source of key system positive ground; an operator's subset coupled to the source; a called party's subset; a supervisory indicator lamp; a line button lamp; and a switching arrangement coupled to the operator's subset, the source, the indicator lamp and the line button lamp to lit the indicator lamp when the operator's subset is taken off-hook to answer an incoming call, to cause the line button lamp to wink when the operator's subset is placed on hold to disperse the incoming call to the called party's subset, to extinguish the indicator lamp and the line button lamp wink when the called party's subset is taken off-hook, and to cause the line button lamp to again wink when the called party's subset is placed on hold after the called party's subset has been taken off-hook.

BRIEF DESCRIPTION OF THE DRAWING

The above-mentioned and other features and objects of this invention and the manner of obtaining them will become more apparent by reference to the following description taken in conjunction with the drawing, the single Figure of which is a schematic diagram partially in block form of the operator supervisory circuit in accordance with the principles of the present invention.

DESCRIPTION OF THE PREFERRED EMBODIMENT

On incoming calls the regular line button lamp LI flashes due to circuitry not shown until the incoming call is answered. When the call is answered at the operator's subset OS, the key system positive ground is applied to the operator's subset "A" lead LD1 through normally closed hold switch S2 and hookswitch S1. This key system positive ground is passed through forward biased diode D1 to operate relay RL1. The positive ground is also passed through the forward biased diode D2 to line card LC which illuminates line button lamp $L_1$ through contacts $C_6$ due to circuitry not shown on line card LC. When relay RL1 is actuated, contacts $RL1_1$ and $RL1_2$ are moved into the position opposite to that shown. Contact $RL1_2$ applies a normal ground to indicator lamp L2 for illumination thereof. Contact $RL1_1$ provides a hold path for relay RL1 when the operator's subset is put on hold. This holding path for relay RL1 is provided by contact B6 when relay B on the line card LC, not shown, is actuated. The positive ground for the key system is coupled to a contact of the contact set $RL1_1$ by a forward biased diode D3. This same positive ground is coupled by forward biased diode D4 to relay RL2 which closes contact set $RL2_1$ to actuate interrupter motor IM which makes and breaks the contact of switch S5 coupled to line button lamp L1 to thereby cause this lamp to wink. Capacitor C1 in shunt relation to relay RL1 slows up the release of this relay so that relay B on line card LC, not shown, will have time to operate and apply positive ground to the holding path for relay RL1. Thus, when the operator's subset is put on hold by hold switch S2, in order to disperse the call, hold switch S2 is placed in an open position removing positive ground from lead LD1, supervisory indicator lamp L2 is lit by actuation of relay RL1 and is maintained actuated by the holding circuit of contacts $RL1_1$. At this time the line button lamp L1 is winking.

When the called party picks up his subset hookswitch S4 closes thereby deactivating relay B due to circuitry not shown on line card L.C. and removes the positive ground through diode D3 to the hold circuit contacts of relay RL1 causing this relay to deactivate and to be returned to the position illustrated and, thereby, extinguish the supervisory indicator lamp L2 which notifies the operator that the called party is now connected through or has answered his subset.

Should the called party now put his subset back on hold, the supervisory indicator lamp associated with that line would not light, although the regular line button lamp would begin to wink once again. This would then indicate to the operator that the called line was answered and put back on hold by the called party. This is accomplished by the called party opening hold switch S3 which again removes a positive ground from the line card and allows relay B to actuate which closes contact B6. This positive ground is then applied to diode D4 to relay RL2. When relay RL2 is operated, a normal ground is applied to the interrupter motor IM which in turn operates switch S5 to cause lamp L1 to wink. When the called party is taken off hold by closing switch S3, contact B6 opens removing the ground from the line start lead LD2 thereby releasing relay RL2 and returning the circuit to the idle condition.

While I have described above the principles of my invention in connection with specific apparatus it is to be clearly understood that this description is made only by way of example and not as a limitation to the scope of my invention as set forth in the objects thereof and in the accompanying claims.

I claim:
1. An operator supervisory circuit for a key telephone system comprising:
    a source of key system positive ground;
    a single hold button operator's subset coupled to said source;
    a single hold button called party's subset;
    a supervisory indicator lamp;
    a line button lamp; and
    a switching arrangement including only relays and relay contacts coupled to said operator's subset, said source, said indicator lamp and said line button lamp to light said indicator lamp when said operator's subset is taken off-hook to answer an incoming call, to cause said line button lamp to wink at a given rate when said operator's subset is placed on hold to disperse said incoming call to said called party's subset, to extinguish said indicator lamp and said line button lamp wink when said called party's subset is taken off-hook, and to cause said line button lamp to again wink at said given rate when said called party's subset is placed on hold after said called party's subset has been taken off-hook.

2. A circuit according to claim 1, wherein
said operator's subset includes
 a first hookswitch coupled to said source, said first hookswitch being closed when said operator's subset is off-hook; and
 a first normally closed hold switch coupled between said arrangement and said first hookswitch.

3. A circuit according to claim 2, wherein
said called party's subset includes
 a second hookswitch coupled to said source, said second hookswitch being opened when said called party's subset is on-hook, and
 a second normally closed hold switch coupled between said second hookswitch and said arrangement.

4. A circuit according to claim 3, wherein
said arrangement includes
 a first relay coupled to said first hold switch actuated by said key system positive ground when said first hookswitch is off-hook,
 a first set of contacts coupled to said indicator lamp controlled by said first relay to light and extinguish said indicator lamp,
 a second and a third set of contacts coupled to said source and said first relay to couple said key system positive ground to said first relay when said second set of contacts are closed and said first relay is actuated to close said third set of contacts to maintain said first relay actuated when said operator's subset is placed on hold,
 a third set of contacts coupled to said first relay controlled by said first relay,
 said second set of contacts coupled to said source to couple said key system positive ground to said first relay when said first relay is actuated to maintain said first relay actuated when said operator's subset is placed on hold,
 a second relay coupled to said second set of contacts actuated by said key system positive ground when said second set of contacts are closed,
 a fourth set of contacts controlled by said second relay, and
 an interrupter connected between said fourth set of contacts and said line button lamp to cause said line button lamp to wink when said second relay is actuated.

5. A circuit according to claim 4, further including
 a first diode coupled between said first hold switch and said first relay;
 a second diode coupled between said first hold switch and said second hold switch;
 a third diode coupled between said third set of contacts and said second set of contacts; and
 a fourth diode coupled between said second set of contacts and said second relay.

6. A circuit according to claim 5, further including
 a capacitor coupled in shunt relation to said first relay to slow up the release of said first relay.

7. A circuit according to claim 1, wherein
said arrangement includes
 a first relay actuated by said key system positive ground when said operator's subset is off-hook,
 a first set of contacts coupled to said indicator lamp controlled by said first relay to light and extinguish said indicator lamp,
 a second set of contacts to couple said key system positive ground to said first relay when said called party's subset is off-hook, when said called party's subset is on hold and when said operator's subset is placed on hold,
 a second and a third set of contacts coupled to said source and said first relay to couple said key system positive ground to said first relay when said second set of contacts are closed and said first relay is actuated to close said third set of contacts to maintain said first relay actuated when said operator's subset is placed on hole,
 said second set of contacts coupled to said source to couple said key system positive ground to said first relay when said first relay is actuated to maintain said first relay actuated when said operator's subset is placed on hold,
 a second relay coupled to said second set of contacts actuated by said key system positive ground when said second set of contacts are closed,
 a fourth set of contacts controlled by said second relay, and
 an interrupter connected between said fourth set of contacts and said line button lamp to cause said line button lamp to wink when said second relay is actuated.

8. A circuit according to claim 7, further including
 a capacitor coupled in shunt relation to said first relay to slow up the release of said first relay.

9. A circuit according to claim 8, further including
 a first diode coupled between said operator's subset and said first relay;
 a second diode coupled between said operator's subset and said second relay;
 a third diode coupled between said third set of contacts and said second set of contacts; and
 a fourth diode coupled between said second set of contacts and said second relay.

* * * * *

UNITED STATES PATENT AND TRADEMARK OFFICE
CERTIFICATE OF CORRECTION

PATENT NO. : 4,029,909

DATED : June 14, 1977

INVENTOR(S) : James Edwin Hinkle

It is certified that error appears in the above-identified patent and that said Letters Patent are hereby corrected as shown below:

Column 3, lines 46 - 52, delete;

Column 4, lines 22 - 26, delete; and

Column 4, lines 34 - 38, delete.

Signed and Sealed this

Nineteenth Day of September 1978

[SEAL]

Attest:

RUTH C. MASON
Attesting Officer

DONALD W. BANNER
Commissioner of Patents and Trademarks